United States Patent [19]

Thornton

[11] 4,144,168

[45] Mar. 13, 1979

[54] FLUID FILTER
[75] Inventor: Donald I. Thornton, Warwick, R.I.
[73] Assignee: Fram Corporation, East Providence, R.I.
[21] Appl. No.: 845,756
[22] Filed: Oct. 26, 1977
[51] Int. Cl.² .............................................. B01D 35/14
[52] U.S. Cl. .................................... 210/130; 210/136; 210/440; 210/457; 137/512.15
[58] Field of Search ............... 210/130, 131, 134, 136, 210/400, 440, 443, 457; 137/512.15, 512.4

[56] References Cited

U.S. PATENT DOCUMENTS

| 3,231,089 | 1/1966 | Thornton | 137/512.4 X |
| 3,529,722 | 9/1970 | Humbert, Jr. | 210/136 X |

Primary Examiner—Ferris H. Lander
Attorney, Agent, or Firm—Ken C. Decker; William N. Antonis

[57] ABSTRACT

A fluid filter, such as that used to filter engine oil in an automotive vehicle, is provided with a combination anti-drainback and relief valve. The relief valve permits oil to bypass the filter if the latter should become clogged, and the anti-drainback valve prevents oil from leaking from the filter when the vehicle engine is not operated. The combination anti-drainback/relief valve includes a shoulder which is disposed between the filtering medium and a supporting flange therefor carried by the base of the filter, and also includes an inwardly extending annular portion which normally closes passages through the flange which permit communication between the inlet and outlet of the filter, and an outwardly extending portion which seals against the base of the filter to trap fluid within the filter when the vehicle engine is off. The valve element includes a spring steel member which is encapsulated in rubber sealing material. The spring steel member includes a plurality of radially extending, circumferentially spaced, relatively movable fingers on the inner and outer peripheries thereof, and the rubber sealing material encapsulates both the fingers ad the spaces therebetween. The fingers exert a resilient biasing force tending to keep both the anti-drainback and relief valves closed until a predetermined pressure differential is attained thereacross. Of course, the pressure differential required to open the anti-drainback valve is much lower than that required to open the bypass valve.

1 Claim, 3 Drawing Figures

4,144,168

FLUID FILTER

BACKGROUND OF THE INVENTION

This invention relates to a fluid filter, particularly of the type used to filter engine oil in an automotive vehicle, concerns an improved anti-drainback and relief valve therefor.

Fluid filters, particularly those used to filter engine oil in an automotive vehicle, are commonly provided with an anti-drainback valve, to trap fluid in the filter and prevent it leaking out of the filter when the vehicle engine is turned off, and are also provided with a bypass valve, which is normally closed, but which opens to permit direct communication between the filter inlet and outlet when the filter becomes clogged, so that the vehicle engine will not be starved for lubrication. One type of such a combined anti-drainback and bypass valve known to the prior art is disclosed in my prior U.S. Pat. No. 3,567,022. However, this valve, although it has been quite successful, has proved to be relatively expensive to manufacture, because of the large number of separate parts required. Another type of combined anti-drainback and bypass valve used in an automotive filter is disclosed in my prior art U.S. Pat. No. 3,231,089. However, this valve is made entirely of rubber, and it has proven difficult to attain opening and closing of the valve at the very close pressure ranges required over the relatively large temperature variations in which automotive vehicles are often operated.

A fluid filter made pursuant to the present invention avoids most of the problems inherent with the prior art assemblies discussed hereinabove. The present invention proposes an anti-drainback/relief valve for an oil filter which consists of only a single, relatively easily manufactured part. The part includes a spring metal inner member encapsulated in a rubber compound. Since the spring rate of the spring member is independent of ambient temperature, the opening and closing of the relief and anti-drainback can be controlled to within a relatively small pressure range independent of the relatively large variations of ambient temperature in which modern vehicles are operated.

SUMMARY OF THE INVENTION

Therefore, an important object of my invention is to provide a combination anti-drainback/relief valve for a vehicle fluid filter which is relatively simple and inexpensive to manufacture.

Still another important object of my invention is to provide a combined anti-drainback/relief valve for an automotive fluid filter in which the opening and closing of the valves may be regulated to within a relatively narrow pressure range over the entire ambient temperature range in which the vehicle may be operated.

DETAILED DESCRIPTION

Figure 1:
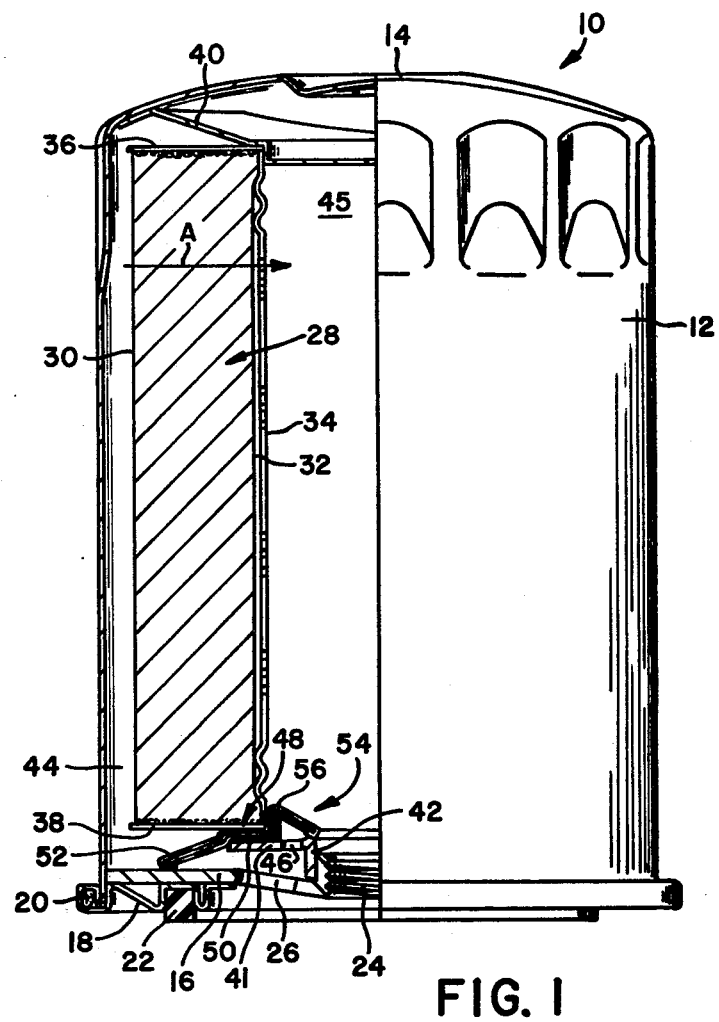
FIG. 1 is a side elevational view, partly in section, of an automotive fluid filter using a combined anti-drainback/relief valve made pursuant to the teachings of my present invention.

Referring now to the drawings, an automotive fluid filter, such as that used to filter engine lubricating oil, is generally indicated by the numeral 10 and includes an outer metal shell 12 which has a closed end 14 and an open end which is closed by a heavy reinforcing plate or closing member generally indicated by the numeral 16. The outer face of plate 16 is provided with a thinner end plate 18 which is secured to the shell 12 by the rolled seam 20. The plate 18 carries an annular seal 22 which engages the engine on which the filter 10 is installed to prevent fluid from leaking between the interface between the filter and the engine. The closure member 16 is provided with a threaded opening 24 which may be screwed onto a supporting stem carried by the engine when the filter is installed thereon. The opening 24 also serves as the outlet port for the filter 10, and openings 26 are spaced circumferentially around the member 16 to serve as inlet ports.

The filter 10 is also provided with an annular cylindrical filtering media generally indicated by the numeral 28, which may, for example, consist of pleated paper or any other material which serves to filter particles in excess of a predetermined size from the engine lubricating oil passed through the filter. The filter media 28 includes an outer circumferential surface 30, an inner circumferential surface 32 which is supported by a perforated centertube 34, an upper end cap 36, and a lower end cap 38. A spring 40 bears against the upper end cap 36 and yieldably urges the media 28 downwardly viewing the Figure, toward a supporting flange 41 which is carried by an annular ring 42 which is supported by the closure member 16. The closure member 16, the flange 41, the end cap 38, the shell 12, and the outer circumferential surface 30 of the media 28 cooperates to define a flow path 44 which communicates the inlet ports 26 with the outer circumferential surface 30 of the filtering media 28. When the engine is in operation, oil is forced through the filtering media 28 in the direction of the arrow A by the engine oil pressure, so that the oil is filtered as it passes through the media 28 and is communicated to the outlet 24 by the volume 45 defined within the centertube 34. Openings 46 are provided in the flange 41 so that lubricating oil may be communicated directly from the inlet ports 26 to the outlet 24 when the filter media 28 becomes clogged, causing the pressure differential between the inlet ports 26 and the outlet port 24 to rise to an unacceptably high level.

The combined anti-drainback/relief valve made pursuant to the present invention is an annular disc generally indicated by the numeral 48. The disc 48 includes a circumferentially extending shoulder 50 which is supported between the flange 41 and the lower end cap 38. The anti-drainback portion consists of a radially outwardly extending portion generally indicated by the numeral 52, and the relief valve portion consists of the radially inwardly extending portion 54 and includes an upwardly bowed portion 56 which projects into the volume 44 defined within the centertube 34. The inner and outer peripheral edges of the disc 48 are provided with sealing lips as at 57 and 58 which are adapted to sealingly engage respectively the ring 42 and a circumferentially extending portion of the closure member 16. It will be noted that the portions 52 and 54 normally prevent communication through the flow path 44 and through the passages 46; however, when the pressure level at the inlet ports 26 increases above that within the filter media 28 a small predetermined amount, the portion 52 will be deflected to permit fluid communication through the flow path 44. This occurs, for example, when the vehicle engine is started. However, when the vehicle engine is not operating, sealing engagement of the portion 52 with the closure 16 prevents fluid from leaking from the filtering media 28 through the inlet ports 26.

Similarly, sealing engagement between the portion 54 and the ring 42 normally prevents communication through the passage 46, forcing the lubricating oil to flow through the filtering media 28. However, when the media 28 becomes clogged so that the pressure differential between the inlet ports 26 and the outlet port 24 raises to an unacceptably high level, this increased fluid pressure deflects the portion 54 of the disc 48 to permit direct communication between the inlet ports 26 and outlet port 24 through the passage 46. Clearly, the pressure level at which the portion 52 is deflected is much less than the pressure level at which the portion 54 is deflected.

Figure 2:
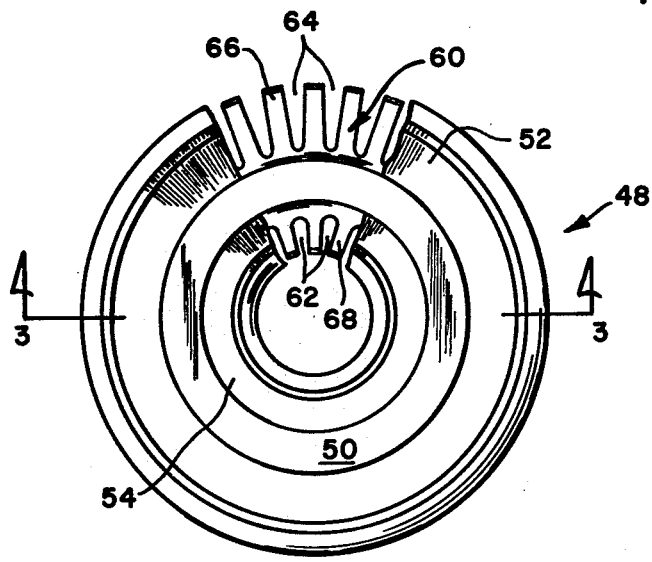
FIG. 2 is a top plan view of a combined anti-drainback/relief valve according to my invention, with the rubber sealing material broken away to clearly illustrate the details of the spring steel member which is a component of my valve and which is encapsulated by the rubber sealing material.
Figure 3:
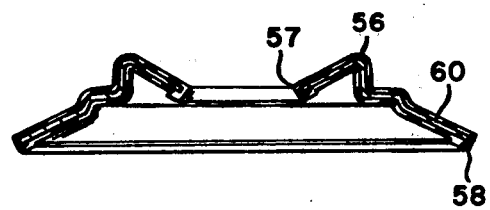
FIG. 3 is a view taken substantially along lines 3—3 of FIG. 2.

Referring now to FIGS. 2 and 3, the combination relief and anti-drainback valve of the present invention is described in detail. The valve consists of a spring steel member 60 which is serrated along its inner circumferential surface as at 62 and along its outer circumferential surface as at 64 so that a plurality of radially extending, circumferentially spaced, relatively movable spring steel fingers 66, 68 are defined along the outer and inner peripheries of the spring steel member 60. The entire member 60, including the spaces between the fingers 66 and 68, are encapsulated within a sealing material, such as rubber, so that fluid flow through the disc is prevented. The spring rate of the spring steel member 60 is relatively constant as a function of temperature, so that the same biasing force which the pressure differentials must overcome is substantially the same regardless of the ambient temperature level. The fingers 66 and 68 exert a biasing force tending to keep the corresponding sealing lips 56 and 58 sealingly engaged with the closure member 16 and sealing ring 42, but yield at a predetermined pressure to perform the anti-drainback and relief valve functions discussed hereinabove.

I claim:

1. In a fluid filter, an outer shell having an open end, an annular cylindrical filter element having inner and outer circumferential surfaces disposed within said shell, a closure member closing said open end, said closure member having an inlet communicating with the outer circumferential surface of said element and an outlet communicating with the inner circumferential surface of said element, support means carried by said closure member between said inlet and outlet and supporting said element so that a flow path is defined between said inlet and the outer circumferential surface of the element, passage means extending through said support means to directly communicate the inlet and outlet when the element is clogged and an annular valve disc defining a circumferentially extending shoulder located between the element and said support means and having an inner circumferential area extending radially inwardly from said shoulder and controlling communication through said passage means and an outer circumferential area extending radially outwardly from said shoulder controlling communication through said flow path, said annular valve disc comprising a spring member encapsulated within a sealing material, said inner circumferential area being serrated radially to define a plurality of circumferentially spaced, independently movable spring fingers, said sealing material encapsulating the fingers and the spaces therebetween to provide an inner continuous sealing surface, the outer circumferential edge of said inner sealing surface sealingly engaging said support means to prevent communication through the passage means until the pressure differential between the inlet and outlet attains a predetermined level sufficient to deflect said fingers, said outer circumferential area being serrated to define a plurality of circumferentially spaced, independently movable spring fingers, said sealing material encapsulating the fingers and the spaces therebetween to define an outer continuous sealing surface, the periphery of said outer sealing surface engaging said closure member to prevent communication through said flow path to prevent fluid from draining from said filter through the inlet.

* * * * *